WILLIAM JUDSON MATTOX INVENTOR

FIG. 3

Dec. 26, 1967 W. J. MATTOX 3,360,582
SEPARATING LINEAR MONOOLEFINS BY ADSORPTION
ON A MOLECULAR SIEVE
Filed March 26, 1964 5 Sheets-Sheet 4

STEAM DESORPTION OF $C_8$ OLEFIN CONTAMINANTS FROM

SODIUM FAUJASITE

300°F.; ATMOSPHERIC PRESSURE

VOLUMES $H_2O$/100 VOLUMES ADSORBENT

FIGURE 4

WILLIAM JUDSON MATTOX INVENTOR

BY *C.B.Barnes*

PATENT ATTORNEY

United States Patent Office 3,360,582
Patented Dec. 26, 1967

3,360,582
SEPARATING LINEAR MONOOLEFINS BY
ADSORPTION ON A MOLECULAR SIEVE
William Judson Mattox, Baton Rouge, La., assignor to
Esso Research and Engineering Company, a corporation
of Delaware
Filed Mar. 26, 1964, Ser. No. 354,981
14 Claims. (Cl. 260—677)

The present invention relates to a process for separating hydrocarbons from their mixtures with one another, and more particularly, to the separation of hydrocarbons which are difficult to separate by distillation because of their similarity of boiling points or their azeotroping characteristics. Still more particularly, the present invention relates to the separation of hydrocarbons from their mixtures with certain natural or synthetic crystalline zeolites having pore openings of uniform diameter of about 6 to 15 Angstrom units and a silica-alumina mol ratio above 3.

It has long been known that certain porous substances, such as silica gel, activated char, and zeolites have certain selective adsorption characteristics useful in resolving a hydrocarbon mixture into its components. Thus silica gel is selective to removing aromatic hydrocarbons from non-aromatic hydrocarbons, and activated chars are useful in separating olefins from mixtures with paraffins. Similarly, certain crystalline zeolites having pore openings of about 5 Angstroms, known as molecular sieves, have the capacity of adsorbing and thus separating straight chain from branched and cyclic hydrocarbons.

There are many otherwise highly desirable separations, however, that these porous adsorbents are not capable of making efficiently. For example, it would be highly desirable to separate linear aliphatic mono-olefins from mixtures of the same with branched and cyclic mono-olefins, diolefins, aromatics, and other hydrogen deficient hydrocarbons inasmuch as there is a great amount of interest in the technical art at the present time with respect to the production of such linear mono-olefins. In the production of these compounds, there are two principal routes to the desired linear olefins, viz., aluminum alkyl growth and wax cracking. It is with the latter method that the instant invention is particularly concerned. Heretofore, it has been found, however, that the quality of such wax cracked olefins is inferior to the growth olefins. Inasmuch as olefin quality is directly related to the quality of the wax feed and to the cracking severity, diolefins, both conjugated and non-conjugated, are generally inherent at practical cracking severity levels. Further, aromatics and cyclic mono-olefins resulting from cyclic structures in the wax feed are also present. Hence, the problem of purifying wax cracked olefins is found to be difficult in that it is necessary to remove impurities which are isomers and have boiling points which are similar to the desired product. Thus, while the known methods of separation are found to be effective for general cleanup, said methods, such as extractive distillation and solvent extraction as well as the above-mentioned adsorption, are either inoperable or require elaborate equipment and, therefore, are economically prohibitive or of poor efficiency, especially when olefins of relatively long chain length, e.g., six or more carbon atoms, are employed.

It is, therefore, an object of the present invention to provide a highly efficient process for separating close boiling olefinic hydrocarbons using crystalline zeolite adsorbents.

It is a further object of the present invention to employ a selective adsorbent to separate close boiling linear aliphatic olefins from branched and cyclic mono-olefins, diolefins, aromatics and other hydrogen deficient hydrocarbons.

It is a still further object of the present invention to provide an adsorption process yielding a purity and extent of linear aliphatic mono-olefin recovery not hitherto realizable.

Other and further objects and advantages of the present invention will appear more clearly in the following more detailed description.

In accordance with the present invention, there is employed a selective hydrocarbon separation agent which comprises a crystalline metallic alumino-silicate zeolite. These crystalline zeolites are characterized by their highly ordered crystalline structure and uniformly dimensioned pores, and have an alumino-silicate anionic cage structure wherein alumina and silica tetrahedra are intimately connected to each other so as to provide a large number of active sites, with the uniform pore openings facilitating entry of certain molecular structures. It has been found that crystalline alumino-silicate zeolites, having effective pore diameters of about 6 to 15, preferably 8 to 15 Angstrom units are effective adsorbents, particularly for the wax-cracked olefin feeds herein contemplated. The size of the pore openings is regarded as critical since smaller openings, e.g. 4 Angstrom units, will not be large enough to allow entry of certain heavy hydrocarbon molecules such as branched chain olefins, cyclic compounds, etc. Additionally, the crystalline nature of the catalyst is important, since it determines the uniformity of the pore openings.

Naturally-occurring large pore crystalline alumino-silicate zeolites may be exemplified by the mineral faujasite which may be beneficially employed. Synthetically produced alumino-silicate zeolites having large pore diameters, such as synthetic faujasite are also available and will be preferred in the present invention. In general, all crystalline alumino-silicate zeolites, in natural or synthetic form, contain a substantial portion of an alkali metal oxide, normally sodium oxide. In accordance with this invention, however, the zeolite employed may also suitably contain any alkali metal oxide of an alkali metal having an atomic number of 11 to 55 inclusive, that is, an alkali metal oxide chosen from the group consisting of potassium oxide, rubidium oxide, or cesium oxide instead of sodium oxide.

In general, the chemical formula of the anhydrous crystalline alumino-silicate zeolites, expressed in terms of mols may be represented as:

$$0.9 \pm 0.2 M_2O : Al_2O_3 : X\ SiO_2$$

wherein M is an alkali metal selected from the group consisting of sodium, potassium, rubidium, and cesium, X has a value above 3, preferably 3 to 7, more preferably 4 to 6.

The processes for synthetically producing crystalline zeolites are well known in the art. Typical processes involve crystallization from reaction mixtures containing $Al_2O_3$ as sodium aluminate, alumina sol and the like; $SiO_2$ as sodium silicate and/or silica gel and/or silica sol; and $Na_2O$ as sodium hydroxide. Careful control is kept over the soda ($Na_2O$) concentration of the mixture, as well as the proportions of silica to alumina and soda to silica, the crystallization period, etc., in order to obtain the desired product. A conventional scheme for preparing crystalline alumino-silicate zeolites of the faujasite type would be as follows:

Colloidal silica, such as commercial Ludox (supplied by E. I. DuPont de Nemours & Co., Inc.) is mixed with a solution of sodium hydroxide and sodium aluminate at ambient temperatures to produce a reaction mixture having the following molar ratios of reactants:

Reactants, mol ratio:
$Na_2O/SiO_2$ _______________ 0.28 to 0.45.
$SiO_2/Al_2O_3$ _______________ 7 to 30.
$H_2O/Na_2O$ _______________ 20 to 60.
$SiO_2/Al_2O_3$ in product _____ 3 to 7, preferably 4–6.

The reaction mixture may then be allowed to digest at to ambient temperatures for up to 40 hours or more in order to aid crystallization, after which period it is heated at 180 to 250° F., e.g., 200 to 220° F., for a sufficient time to crystallize the product, e.g. 24 to 200 hours or more. The crystalline, metallo alumino-silicate is separated from the aqueous mother liquor by decantation or filtration and washed to recover a crystalline product.

If desired, the crystalline alumino-silicate product may be incorporated into a supporting matrix. In this embodiment, the preformed zeolite crystals are added to a suitable gelatinous precipitate, hydrogel or hydrosol, e.g. a colloidal sol, and the resulting mixture is homogenized by passage through a blending apparatus, such as a colloid mill, ball mill, and the like. The homogeneous slurry is then formed into particles of the size range desired for adsorption bed operations. This is conveniently accomplished by spray drying, although other methods may be employed.

While the process of the present invention is generally applicable to any mixture of linear aliphatic olefins with branched and cyclic mono-olefins, diolefins, and aromatics, the mixtures shown herein are products of wax cracked petrolatum feedstocks. This is merely illustrative and not intended in any way to limit or restrict this invention. It must be pointed out, however, that in view of the general inferiority of the quality of wax cracked olefins as hereinbefore mentioned, the fact that such wax cracked olefins are effectively purified is an outstanding advantage of the present process. Thus, the present invention is preferably applicable to mixtures comprising hydrocarbons having from 6 to 30 carbon atoms, and especially applicable to mixtures comprising hydrocarbons having from 7 to 20 carbon atoms, regardless of the source of the mixture. The invention is also applicable to feeds comprising a particular olefin cut within said range of 6 to 30 carbon atoms, e.g. a $C_8$ or $C_{16}$ olefin cut.

The difficulties involved in obtaining an efficient separation of the above discussed mixtures will be realized by a consideration of the boiling points of each of the components of one of the mixtures in question. For example, at standard atmospheric pressure representative components boiling in the range of a $C_8$ wax cracked olefin have normal boiling points as presented in the following tabulation:

| Component: | Boiling point, ° F. |
|---|---|
| Octene-1 | 248.5 |
| 1,3-dimethylcyclohexene | 255-259 |
| 4,4-dimethylcyclohexene | 248-252 |
| 2,4-dimethylcyclohexene | 264 |
| 3,3-dimethylcyclohexene | 246 |
| 1,4-octadiene | 232.2 |
| 1,5-octadiene | 248 |
| 1,7-octadiene | 243 |
| 2,6-octadiene | 256.1 |
| 2,5-dimethyl-2,3-hexadiene | 246-253 |
| 4-ethyl-1,4-hexadiene | 252.1 |
| Ethylbenzene | 277.1 |

The separation is, however, even more difficult than would be anticipated even in view of the above close boiling points, inasmuch as constant boiling mixtures are often formed between components of the mixture.

Figure 1:
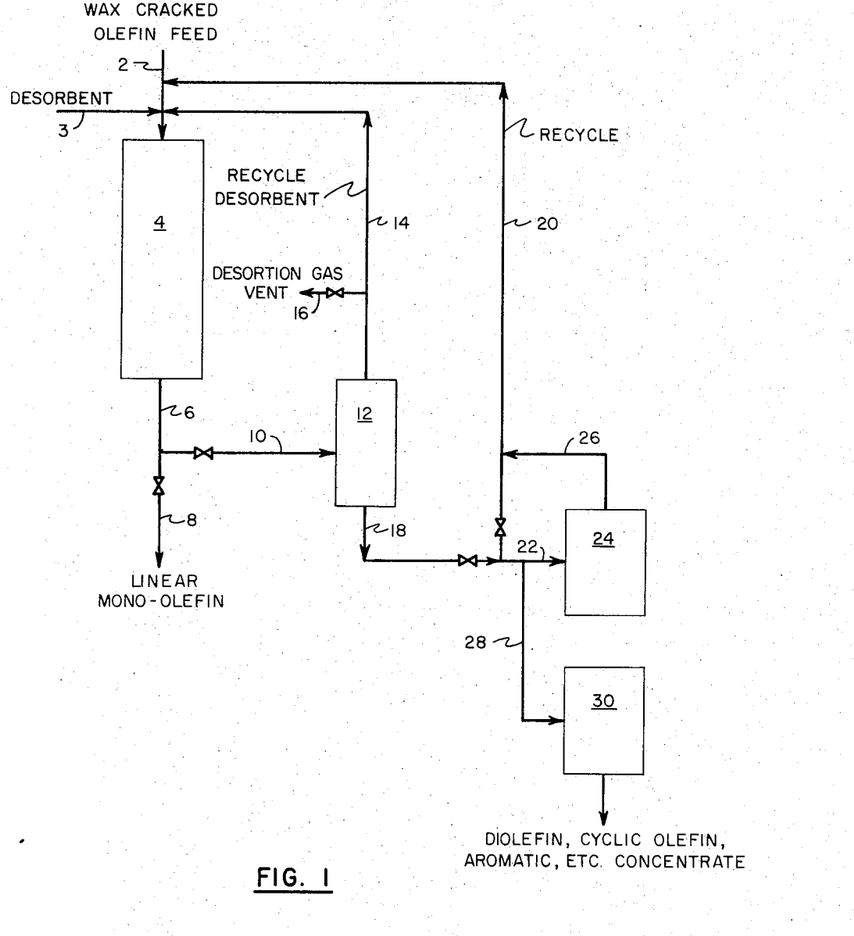

The process of the present invention may be understood more clearly when read in conjunction with FIGURE 1, which is a flow plan of a preferred embodiment of the invention depicting, as an example, the separation of mono-olefins from a $C_8$ olefin fraction containing said mono-olefin along with diolefins, aromatics, etc. that is, other hydrogen-deficient hydrocarbons. These hydrocarbon compounds are obtained, for example, from the cracking of petrolatum.

Turning now to FIGURE 1, the stream from a steam cracking unit (not shown) is passed via line 2 to adsorption zone 4. This is a tower containing one or more of the zeolites described above. Preferably, the feed is in vaporized form. The adsorbent may be arranged in trays, or packed in supports or be unsupported. Though, as will be shown hereinlater, the conditions for most efficient separations vary within certain described parameters, it is critical to the present invention that the tower be operated within said parameters. Thus, conditions within tower 4 include flow rates of 0.1 to 10 w./w./hr., preferably 0.2 to 5 w./w./hr.; temperatures in the range of 70 to 650° F., preferably 100 to 550° F., and pressures of below atmospheric to moderately super atmospheric, preferably 0.01 to 15 atmospheres. If the sodium form is used, it is especially preferred to utilize temperature below 300° F., i.e., in the range of 100 to 250° F., for reasons hereinlater set forth more fully. A product stream consisting essentially of linear aliphatic mono-olefins (Type I) is withdrawn through lines 6 and 8, while the adsorbed material contains the branched and cyclo-olefins and more hydrogen deficient hydrocarbons in substantially higher concentrates than these impurities are present in the feed.

When the branched mono-olefin isomer, diolefin, or aromatic appears in the effluent, or as soon as desirable, depending upon the purity required, the flow of feed through line 2 is halted and the desorption cycle begins. This may be carried out by one of several, essentially conventional ways. For example, a desorbent, such as hot ammonia, methane, steam, alcohol, carbon dioxide, and the like may be passed through lines 3 and 2 into vessel 4 at a temperature of about 100 to 650° F. to desorb and/or strip the adsorbate. The mixture of desorbent and adsorbate is passed to cooler-separator 12 in which the adsorbate is separated from the desorbent in said cooler-separator 12. Recycle desorbent is circulated via line 14 after option venting of gases through line 16, while desorbed product is passed to temporary storage zone 24 via lines 18 and 22. The desorbed product is a mixture consisting essentially of diolefins, cyclic olefins, aromatics, and some linear, mono-olefins. Since the process cycle will usually be terminated before any or any substantial quantity of objectionable impurity appears in the effluent, the initial desorbate recovered from zone 4 may contain relatively high concentrations of linear mono-olefins suitable for recycle. This initial portion of the desorbate may therefore, after recovery in separator 12 be directed through line 18 to recycle line 20 or to temporary storage vessel 24 through the line 22 and subsequently through line 26 to recycle line 20. After the build-up of contaminants in the recovered desorbate stream above practical limits, this stream will preferably be diverted through line 28 to desorbed product storage vessel 30.

When the desorption and purging are complete, the adsorption cycle may be repeated. The process can also be made continuous by employing two or more adsorption columns simultaneously. The final product thus is substantially pure $C_8$ Type I olefin.

The process of the present invention may be further illustrated by the specific examples below.

Example I

This example serves to illustrate the preparation of the zeolite adsorption agents employed. Samples of synthetic sodium faujasite were prepared by the following typical procedure. Portions of these materials were used as adsorbents without further treatment while other portions served as the starting materials for subsequent ion-exchange treatments to produce modified faujasite adsorbents. A solution of (1) commercial sodium aluminate containing 38 wt. percent $Na_2O$, 38 wt. percent $Al_2O_3$, and 24 wt. percent $H_2O$, and (2) sodium hydroxide containing 75 wt. percent $Na_2O$ in water was added to (3) a commercially available aqueous sol in colloidal silica containing about 30 wt. percent $SiO_2$ and a weight ratio of soda-to-silica equal to 1:285 ("Ludox" solution supplied by E. I. du Pont de Nemours & Co.), under rapid stirring conditions at ambient temperature, e.g. about 75° F., to form an essentially homogeneous mixture. The homogeneous reaction mixture was aged for up to about 10 hours at ambient temperature and then heated to and held at a temperature of about 200 to 215° F., e.g. 210° F., until the product sufficiently crystallized. The crystallization period was determined by the length of time necessary to produce maximum crystallinity of product, as measured by periodically withdrawing a sample and analyzing for crystallinity by X-ray diffraction techniques. The crystallization step was terminated by quenching the reaction mixture with large volumes of cold water. The crystalline product was then separated from the mother liquor by filtration, thoroughly water-washed until the wash water had a pH of about 9.3, and finally dried at a temperature of about 265° F.

The silica-to-alumina ratio of the product will depend upon the proportions of the above ingredients used. For example, to produce a silica-to-alumina ratio of about 4.2, the following amounts of ingredients were used: 6870 grams of 97% NaOH, 1513 grams of sodium aluminate, 37.6 kg. of silica sol, and 27 liters of water. This material analyzed, after drying, 14.0% $Na_2O$, 58.6% $SiO_2$, and 23.4% $Al_2O_3$. On a mol basis, this analysis corresponds to 0.98 $Na_2O$:1.00 $Al_2O_3$:4.2 $SiO_2$.

To produce a silica-to-alumina ratio of about 5.3, the above amounts of ingredients were adjusted as follows: 6000 grams of NaOH, 1700 grams of sodium aluminate, 38.6 kg. of silica sol, and 21.5 liters of water. This faujasite analyzed, after drying, 13.7% $Na_2O$, 66.8% $SiO_2$, and 21.3% $Al_2O_3$. On a mol basis this corresponds to 1.07 $Na_2O$:1.00 $Al_2O_3$:5.3 $SiO_2$. The 2.5 silica:alumina ratio faujasite was obtained as a commercially available product.

Portions of the above sodium-form faujasites were subjected to cationic exchange by contacting 1000 grams of the dried (250–300° F.) powder one or more times with a solution of 50–900 grams of a soluble metal salt, such as the chloride, chlorate, sulfate, acetate, etc., in 2 to 3 liters of water. The treating time for each exchange was sufficient to produce an equilibrium state and was typically about one-half to one hour. The zeolites were separated from the aqueous solutions by filtration or decantation and after the final exchanges were water washed to remove all soluble salts.

The partially dried faujasites were formed into 3/16-inch pellets and then calcined at a suitable temperature, usually between about 400 and 1000° F., immediately prior to their use in the adsorptive fractionations described in the following examples.

Example II

The following example illustrates the vapor phase separation of $C_8$ olefin from wax cracking. The pelleted 4.2 $SiO_2$:$Al_2O_3$ ratio sodium-form synthetic faujasite of Example 1 was placed in an adsorption column as a fixed-bed and a vaporized $C_8$ olefin fraction obtained from the cracking of petrolatum was passed into the adsorbent at a feed rate of 0.1 w./w./hr., a temperature of 80° F., and a pressure of 5–8 mm. Total adsorption of the olefinic feed was obtained until 0.19 w./w. had been fed. Further adsorption of feed vapor then resulted in the preferential displacement of the least strongly adsorbed mono-olefin which was collected by condensation in a receiver cooled with solidified carbon dioxide. When 0.86 w./w. of feed had been passed over the adsorbent, the flow was discontinued and the remaining adsorbed hydrocarbons were desorbed with alcohol (0.30 w./w.). A number of fractions, each representing about 5–6% or less of the feed, was collected for inspection which included refractive index, density, and bromine number determinations and infrared and ultraviolet examinations. Total recovery amounted to 98%.

The resulting bromine numbers showed a recovered product with an average number of about 140 up to 79–80% recovery, the theoretical bromine number for octene being 142.7. The remaining fractions, especially those in the 90–95% recovery range, increased rapidly in unsaturation and attained a bromine number level of 255, which corresponds to a diolefin content of 77%. The fractions comprising the bulk of the purified octene were blended into two composites representing 0–34% and 35–79% portions of the octene concentrate. The composition of each of these composites was determined by a combination of chemical and physical methods with the following results.

|  | $C_8$ Feed | Test Number |  |  |
|---|---|---|---|---|
|  |  | 1 | 2 | 3 |
| Octene Fraction, Volume Percent of Feed | 100 | 0–34 | 35–79 | 0–79 |
| Purified Octene Analysis: |  |  |  |  |
| Mono-olefins, Percent: |  |  |  |  |
| Linear | 75.5 | 87.4 | 83.3 | 85.1 |
| Cyclic | 7.3 | 5.8 | 12.4 | 9.6 |
| Diolefins, Percent: |  |  |  |  |
| Conjugated | 2.5 | 0.00 | 0.00 | 0.00 |
| Non-conjugated | 11.0 | 5.9 | 4.1 | 4.8 |
| Aromatics, Percent | 3.2 | 0.0 | Trace | Trace |
| Saturates, Percent | 0.5 | 0.9 | 0.2 | 0.5 |
| Olefin Type, Percent: |  |  |  | 3 |
| I | 93 | 96 | 93 |  |
| II | 3 | 3 | 3 | 94 |
| III | 3 | 1 | 2 | 2 |
| IV | 1 | 0 | 2 | 1 |
| Carbon Number, Percent: |  |  |  |  |
| $C_7$ | 1.4 | 6.0 | 0.6 | 2.9 |
| $C_8$ | 92.4 | 92.5 | 93.9 | 93.3 |
| $C_9$ | 6.2 | 1.5 | 5.5 | 3.8 |
| $CH_3$/Mol | 1.11 | 1.14 | 1.16 | 1.15 |

These data show that the adsorptive fractionation with synthetic faujasite completely removed conjugated diolefins, all but mere traces of aromatics, and 56% of the non-conjugated diolefins. Although the initial portions of the purified olefin (0–34% fraction) had a decreased cyclic mono-olefin content, there was no over-all reduction in this component when treating 0.86 weights of feed per weight of adsorbent between desorptions. However, by decreasing the w./w. between desorptions it is found that the cyclic mono-olefin content of the purified olefin can be minimized.

Example III

An adsorptive fractionation was carried out as in Example II except the pressure was atmospheric and the temperature was 300° F. Under these conditions, considerable double bond isomerization took place, as illustrated by the following comparative data.

| Temperature, ° F | Feed | 80 | 300 |
|---|---|---|---|
| Olefin Type Analysis, Percent: |  |  |  |
| Type I | 93 | 94 | 72 |
| Type II | 3 | 3 | 22 |
| Type III | 3 | 2 | 0 |
| Type IV | 1 | 1 | 6 |

Although no shifting of the double bond was observed in the 80° F. treat, the Type I olefin content decreased from 93% to only 72% at 300° F.

*Example IV*

A more extensive series of adsorptive fractionations was effected employing the same feed and adsorption agent as those employed in the foregoing examples. In this example, tests were made at 80°, 240°, and 300° F. for comparison purposes. Feed rate was varied from 0.07 to 0.8 w./w./hr. and pressure from 5 to 760 mm. The resulting data are tabulated below in Table I.

TABLE I.—VAPOR PHASE PURIFICATION OF $C_8$ PETROLATUM OLEFIN WITH SYNTHETIC SODIUM FAUJASITE

[4.2 $SiO_2$:$Al_2O_3$ Ratio Faujasite]

|  | Feed | Test No. | | | | |
|---|---|---|---|---|---|---|
|  |  | 4 | 5 | 6 | 7 | 8 |
| Test, Hours |  | 0-3.5 | 0-3.8 | 0-5.9 | 0-3.4 | 0-0.75 |
| Temperature, °F |  | 80 | 240 | 300 | 300 | 300 |
| P, mm |  | 5 | 350 | 760 | 760 | 760 |
| V./v./hr |  | 0.06 | 0.06 | 0.05 | 0.29 | 0.60 |
| W./w./hr |  | 0.08 | 0.08 | 0.07 | 0.40 | 0.83 |
| W./w. (total)[1] |  | 0.28 | 0.30 | 0.41 | 1.4 | 0.62 |
| Purified Octene: |  |  |  |  |  |  |
| Bromine No | 151 | 142 |  |  | 140 | 143 |
| Olefin Type, Percent: |  |  |  |  |  |  |
| I | 93 | 94 | 84 | 35 | 72 | 80 |
| II$_t$ | 3 | 3 | 10 | 49 | 17 | 13 |
| II$_c$ |  |  | 2 | 11 | 5 | 3 |
| III | 3 | 2 | 0 | 0 | 0 | 0 |
| IV | 1 | 1 | 4 | 5 | 6 | 4 |
| Mono-Olefins, Percent: |  |  |  |  |  |  |
| Linear | 75.5 | 89.7 |  |  |  |  |
| Cyclic | 7.3 | 5.9 |  |  |  |  |
| Diolefins, Percent: |  |  |  |  |  |  |
| Conjugated | 2.5 | 0.0 |  |  | 0.07 | 0 |
| Non-conjugated | 11.0 | 4.0 |  |  |  |  |
| Aromatics, Percent | 3.2 | Trace |  |  | 0 | 0 |
| Saturates, Percent | 0.5 | 0.4 |  |  |  |  |
| Carbon Number, Percent: |  |  |  |  |  |  |
| $C_7$ | 1.4 | 0.1 |  |  |  |  |
| $C_8$ | 92.4 | 96.3 |  |  |  |  |
| $C_9$ | 6.2 | 3.6 |  |  |  |  |
| $CH_3$/Mol | 1.11 | 1.14 |  |  |  |  |

[1] Full capacity of adsorbent not reached.

Figure 2:
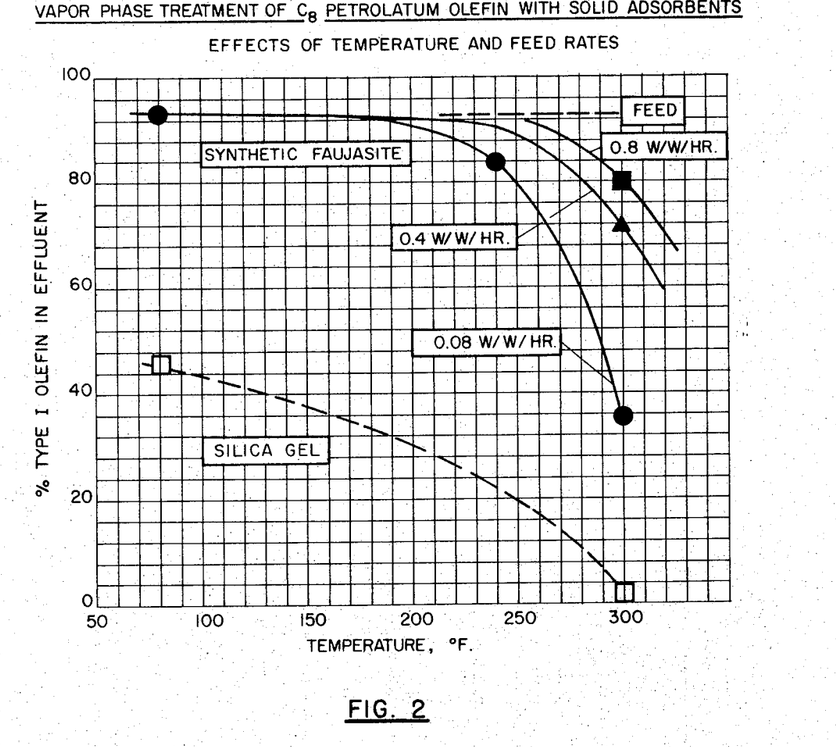

Correlated effects of temperature and feed rate on olefin isomerization are shown in FIGURE 2.

From the foregoing examples it is apparent that the contacting of crude $C_8$ olefin vapor with synthetic sodium faujasite gives remarkably good removal of aromatics and conjugated diolefins, with the concomitant substantial removal of non-conjugated diolefins of about 50% or more. These purifications are accomplished without olefin isomerization provided the adsorption temperature is below about 200–250° F., depending upon the feed rate. Higher feed rates minimize isomerization effects.

The olefin fractions purified at the lower temperature level (80° F.) where no isomerization occurred showed complete removal of conjugated diolefins and aromatics and 56 to 64% removal of non-conjugated diolefins. The initial portions of the purified olefin (0–34% of yield) had a decreased cyclic mono-olefin content, but there was no over-all reduction of this component in the 79% recovery of mono-olefin concentrate from Test Nos. 1 and 2 of Example II. In addition, a test of longer duration in which 2.5 w./w. of purified olefin was produced, was also made. In this test, no aromatics were found in the treated product.

*Example V*

For the purpose of comparison, an evaluation was made of silica gel as a selective absorbent for olefin purification under the same conditions as used in Example III. There was considerable loss of olefinicity in the treated octene as indicated by a decrease in bromine number to 88, apparently by hydrogen transfer, condensation, etc., reactions. Synthetic faujasite under the same conditions (Example IV) gave a treated product of 140 bromine number (Octene=142.7).

As hereinbefore noted, the temperatures, pressures, and feed rates employed in the separation step are critical and variations in same have a very pronounced effect on the resulting purifications with sodium faujasite. The effect of temperature is readily discernable from the above comparisons of separations made at otherwise similar conditions, but at temperatures of 80 to 300° F., as illustrated in FIGURE 2. In this graphical figure, there is also represented a series of vapor phase treatments made with silica gel as the adsorbent, and which utilized the $C_8$ petrolatum olefin feed employed in the foregoing examples.

Rates of 0.07, 0.4 and 0.8 w./w./hr. were employed and at the temperatures presented on the graph and all are presented in relation to a series.

From such figure, it can be easily noted that temperature and feed rate have a pronounced effect on olefin isomerization and thus on the over-all effectiveness of the separation. It can be noted too that the higher rates have at least partially overcome the tendency of the double bond to shift and will permit satisfactory operation at only moderately reduced pressures. Even at the highest throughput evaluated (0.8% w./w./hr.) no detectable breakthrough of aromatics or conjugated diolefins was observed. The total throughput of feed (0.62 w./w.) was still below the full capacity of the sodium faujasite adsorbent.

It is also noteworthy that isomerization also appears to be related to total quantity of feed processed, as evidenced by the following data on purified $C_8$ olefin from tests made with sodium faujasite at 300° F., atmospheric pressure, and at feed rates of 0.4 w./w./hr.

| Purified octene, Type I olefin, percent: | Feed, w./w. (total) |
|---|---|
| 68 | 0–0.66 |
| 72 | 0–1.4 |
| 82 | 1.5–1.6 |

*Example VI*

Liquid percolation treats of a crude petrolatum olefin fraction were also made with two samples of sodium-form synthetic faujasite. In these tests a $C_8$ fraction which contained 3.2% aromatics and 2.5% conjugated diolefins was percolated through granular beds of the faujasite at 80° F. in a 25/1 l./d. ratio column. The following tabulation compares the data from these tests with vapor phase adsorptive separation.

PERCOLATION vs. VAPOR PHASE ADSORPTION WITH SYNTHETIC SODIUM-FAUJASITE AT 80° F.

|  | Feed | Type Treat | |
|---|---|---|---|
|  |  | Percolation | Vapor Phase |
| Faujasite $SiO_2$/$Al_2O_3$ Ratio |  | 2.5 | 4.2 |
| Test No |  | 9 | 10 | 11 |
| Pressure |  | Atmos. | Atmos. | (mm.) 10 |
| Purified Octene:[1] |  |  |  |  |
| W./w |  | 0.06 | 0.16 | 0.6 |
| Percent of Feed | 100 | 6.4 | 16.1 | 70.0 |
| Olefin Type, Percent: |  |  |  |  |
| I | 93 |  | 93 | 93 |
| II$_t$ | 3 |  | 2 | 2 |
| III | 3 |  | 1 | 1 |
| IV | 1 |  | 4 | 4 |

[1] Aromatic and conjugated diolefin free.

Although these tests demonstrate the feasibility of using synthetic faujasites in liquid phase percolation type operations for olefin purification, this method resulted in low treated olefin throughputs (0.06–0.16 w./w.) and in low yields of purified product (6–16% per pass) due to the large liquid holdup in the column. The higher silica: alumina ratio faujasite had a more favorable treating capacity than the lower ratio adsorbent.

Liquid percolation of the crude octene fraction over silica gel at 80° F. removed the objectionable contaminants only at very low feed rates, low adsorbent capacity, and in columns of high length:diameter ratio (>25/1 l./d.).

Example VII

This example illustrates the treatment of a $C_7$–$C_9$ fraction with the sodium form of faujasite which resulted in cleanup about equivalent to that obtained with the narrow cut $C_8$ previously employed (Examples II and IV). Aromatics and conjugated diolefins were almost completely removed, but cyclic mono-olefins and non-conjugated diolefins were somewhat higher. The resulting data are presented below.

|  | Treatment With Sodium Form Faujasite | | |
|---|---|---|---|
|  | $C_7$–$C_9$ | | (Examples II & IV) Previous $C_8$ Product |
|  | Feed | Product |  |
| Mono-olefins, Linear, Percent | 74.5 | 86.3 | 83.3–89.7 |
| Mono-olefins, Cyclic, Percent | 9.3 | 7.2 | 5.8–12.4 |
| Diolefins, Conjugated, Percent | 1.8 | Trace | Trace |
| Diolefins, Non-conjugated, Percent | 10.9 | 6.0 | 4.0–5.9 |
| Type I Olefins, Percent | 93 | 94 | 93–96 |
| Aromatics | 3.2 | Trace | Trace |

The faujasite capacity apparently is substantially the same for treating the $C_7$–$C_9$ cut as for the $C_8$ treatment.

In addition to those already described, there are also other critical factors which significantly affect the efficiency of the separation of impurities from mono-olefins. These can be classified as the effects of (a) moisture, (b) cationic exchange, and (c) silica/alumina ratio.

Example VIII

Figure 3:
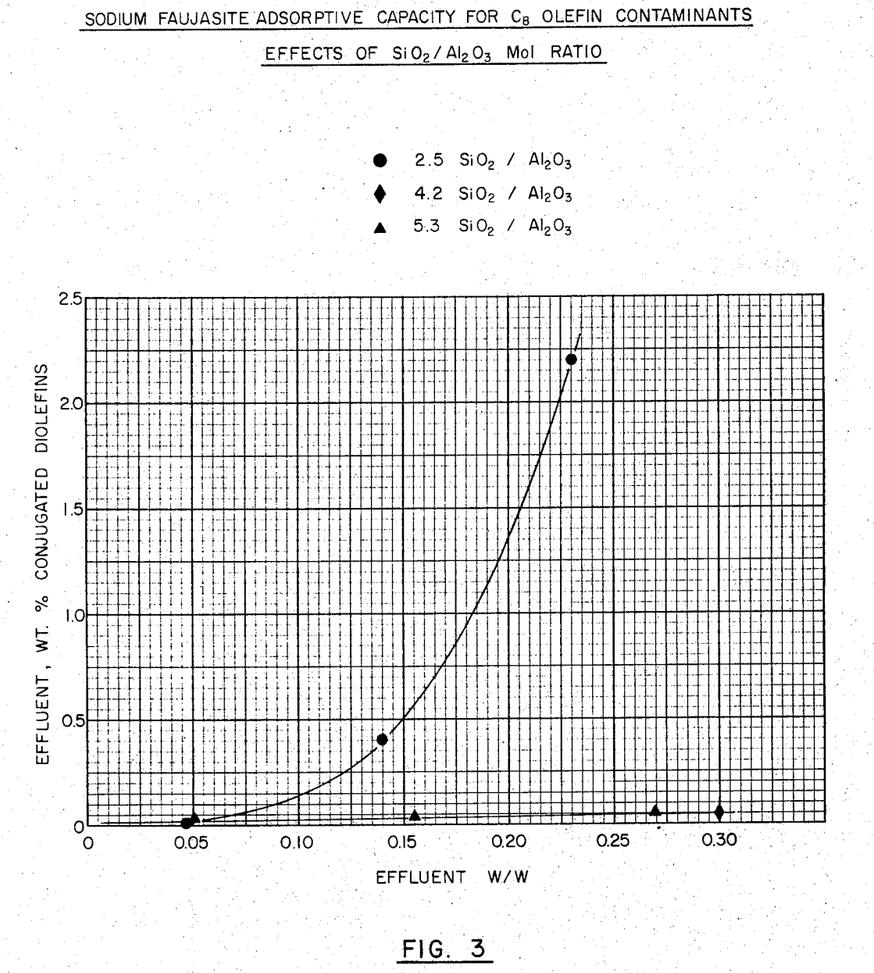

In order to exemplify the effects of silica/alumina ratio, tests were made with crude $C_8$ olefin feed and sodium faujasites of different silica/alumina mol ratios with very pronounced differences resulting in adsorptive capacity and in olefin isomerization activity. The results of these tests are summarized below. The conjugated diolefin content of the treated effluents is shown in the accompanying FIGURE 3 as a function of effluent w./w.

EFFECTS OF $SiO_2/Al_2O_3$ MOL RATIO ON FAUJASITE ADSORPTIVE CAPACITY FOR $C_8$ OLEFIN CONTAMINANTS

[300° F.; Atmospheric Pressure]

|  | Feed | Test No. | | |
|---|---|---|---|---|
|  |  | 12 | 13 | 14 |
| Faujasite $SiO_2/Al_2O_3$ Ratio |  | 2.5 | 4.2 | 5.3 |
| Feed Rate, w./w./hr |  | 0.34 | 0.39 | 0.38 |
| Octene Concentrate: |  |  |  |  |
| Percent Olefin Type Analysis: |  |  |  |  |
| I | 93 | 90 | 68 | 84 |
| $II_t$ | 3 | 3 | 25 | 10 |
| $II_c$ |  |  | 1 | 3 |
| III | 3 | 1 | 2 | 0 |
| IV | 1 | 5 | 5 | 3 |
| Percent Conjugated Diolefins @: |  |  |  |  |
| 0.05 w./w. Effluent | 2.5 | 0.02 | 0.0 | 0.0 |
| 0.10 w./w. Effluent |  | 0.15 | 0.0 | 0.0 |
| 0.23 w./w. Effluent |  | 2.2 | 0.0 | 0.0 |
| Percent Aromatics (@ 0–0.3 w./w.) | 3.2 | 0 | 0 | 0 |

Although the low (2.5) ratio faujasite showed very little isomerization activity and removed all aromatics, the capacity for conjugated diolefins was quite limited. The correlated data shown in FIGURE 3 indicate that no more than about 0.05 to 0.1 w./w. of conjugated diolefin-free effluent could be produced with this ratio faujasite under such conditions. The 5.3 $SiO_2/Al_2O_3$ ratio material has the decided advantage of only moderate isomerization activity and high adsorptive capacity for conjugated diolefins. The effluents produced with the faujasites of 4.2–5.3 ratio contained not more than trace amounts of conjugated diolefins up to the extent of the w./w. evaluated.

Example IX

With regard to the effects of cationic exchange, it has been found that by means of cationic exchange the original sodium ions in the faujasite may be replaced by various other ions so as to effect changes in adsorptive and catalytic properties. For example, the tendency of sodium faujasite to promote olefin isomerization can be modified by cationic exchange with other ions. Lithium exchange increases isomerization activity, but potassium, rubidium, and cesium exchange decreases this activity. Strontium, calcium, cadmium, and silver forms promote olefin saturation by hydrogen transfer or other reactions. The various forms of the faujasite experimentally used in the olefin purification process of this invention were prepared and evaluated in the manner hereinbefore described. The resulting data are summarized below. All samples were dried at 900–1000° F. preceding the olefin adsorption.

EVALUATION OF CATIONIC EXCHANGED FAUJASITES FOR $C_8$ OLEFIN PURIFICATION

[Temp., 300° F.; Press., Atm.; w./w./hr., 0.4]

| Purified Octene | Untreated $C_8$ Feed | Faujasite Cation | | | | | | | |
|---|---|---|---|---|---|---|---|---|---|
|  |  | Li | Na | K | Rb | Cs | Sr | Ca | Ag | Cd |
|  |  | Test No. | | | | | | | |
|  |  | 15 | 16 | 17 | 18 | 19 | 20 | 21 | 22 | 23 |
| Olefin Type, Percent: |  |  |  |  |  |  |  |  |  |
| I | 93 | 60 | 68 | 91 | 92 | 87 | Not determined due to excessive olefin saturation. | | |
| $II_t$ | 3 | 30 | 25 | 2 | 2 | 4 | | | |
| $II_c$ |  | 7 |  | 0 | 1 | 1 | | | |
| III | 3 | 0 | 2 | 2 | 1 | 2 | | | |
| IV | 1 | 3 | 5 | 5 | 4 | 6 | | | |

The olefin concentrates from the treats with potassium, rubidium, and cesium faujasite show negligible if not complete absence of Type I isomerization at atmospheric pressure and 300° F. The lithium and sodium forms gave products of 25–30% decreased alpha olefin content. Cadmium, silver, calcium, and strontium forms gave extensive olefin saturation.

The adsorptive properties of potassium and higher atomic number alkali metal exchanged faujasites are particularly attractive for olefin purification. These exchanged forms do not promote isomerization of alpha-olefins to internal olefins and have attractive levels of adsorptive capacity. Some of these preparations, particularly the potassium form, were used in more extensive purification operations as illustrated by the data in the following table.

EVALUATION OF ALKALI METAL EXCHANGED FAUJASITES FOR $C_8$ OLEFIN PURIFICATION

[Atmospheric Pressure; 0.2–0.4 w./w./hr. Adsorbents Dried at 1000° F.]

| Faujasite Adsorbent: |  |  |  |  |  |  |  |  |  |  |
|---|---|---|---|---|---|---|---|---|---|---|
| $SiO_2/Al_2O_3$ Mol Ratio | 5.3 | 5.3 | 4.2 | 4.2 | 5.3 | 5.3 | 5.3 | 5.3 | 5.3 | 5.3 |
| Cationic Form | Na | Na | K | K | K | K | K | Rb | Rb | Cs |
| $Na_2O$, wt. Percent | 13.7 | 13.7 | 0.9 | 0.9 | 1.8 | 1.8 | 1.8 | 2.8 | 2.8 | 2.8 |
| Sodium Replacement, Mol Percent | 0 | 0 | 94 | 94 | 82 | 28 | 25 | 75 | 75 | 71 |
| Adsorption Test No | 24 | 25 | 26 | 27 | 28 | 29 | 30 | 31 | 32 | 33 |
| Temperature, ° F | 300 | 500 | 300 | 500 | 300 | 400 | 300 | 300 | 400 | 300 |
| Adsorbent Capacity, w./w.[1] | 0.47 |  | 0.15 | 0.13 | 0.13 | 0.13 | 0.23 | 0.17 | 0.11 | 0.17 |
| Type I Olefin in Effluent, Percent | 80 | 6 | 91 | 91 | 90 | 88 | 88 | 92 | 90 | 87 |

[1] Conjugated diolefin and aromatic free.

These comparisons again illustrate the high adsorptive capacity of sodium faujasite for mono-olefin purification and the tendency of this form to promote olefin isomerization in the temperature range of 300 to 500° F. and above. For purifications in which it is desirable to avoid alpha olefin isomerization to internal olefins, faujasites exchanged with potassium and higher atomic number alkali metal ions are preferred. The above presented data show that the moderately exchanged (Test No. 30; 25%) K-faujasite had an adsorptive capacity approximately twice that of the more extensively exchanged (Test Nos. 28 and 29; 82%) preparations. This improved capacity is still below that of the unexchanged sodium form but was achieved without substantial isomerization. Thus, adsorptive capacity may be somewhat lower with these forms, depending upon the extent of the exchange, but the levels of purification capacity demonstrated by the above data for some nearly completely exchanged preparations are well within practical limits. Hence, the extent of exchange may be varied in relation to the temperature employed in the adsorption so as to attain maximum adsorptive capacity while at the same time avoiding olefin isomerization.

More detailed composition data on the octene purified by potassium faujasite adsorption at 500° F. (Test 27) are shown below.

PURIFICATION OF $C_8$ OLEFIN WITH POTASSIUM FAUJASITE

[500° F., 0.2 w./w./hr.]

| Product Composition, wt. percent | Feed | Product |
| --- | --- | --- |
| Mono-olefins: | | |
| Linear | 75.5 | 89.3 |
| Cyclic | 7.3 | 4.4 |
| Diolefins: | | |
| Conjugated | 2.5 | Trace |
| Non-conjugated | 11.0 | 5.6 |
| Aromatics | 3.2 | Trace |
| Saturates | 0.5 | 0.5 |
| Olefin Type, Percent on Linear Mono-olefins: | | |
| I | 93 | 91 |
| II | 3 | 3 |
| III | 3 | 1 |
| IV | 1 | 5 |

These results also show that the linear olefin content appreciably increased, that the aromatics and conjugated diolefins were reduced to trace quantities, and that the cyclic mono-olefin content was greatly reduced.

Example X

In order to illustrate further the utility of potassium faujasite for removing impurities from mono-olefins, a $C_{16}$ olefin fraction of excellent quality was prepared by vapor phase selective adsorption at 300° F. and 10 mm. pressure. The conjugated diolefin content was reduced from 5% in the feed to 0.04% or less and the aromatics to trace quantities. The purified olefin had a Type I olefin content of 97% and was obtained with a minimum adsorbent capacity of 0.6 w./w. The following data were obtained on fresh adsorbent (Cycle 1) and on the regenerated adsorbent (Cycle 2) after steaming at 300° F. and drying at 1000° F.

[Temp., 300° F.; press., 10 mm.; w./w./hr., 0.37]

| | Feed | Cycle 1 | Cycle 2 |
| --- | --- | --- | --- |
| Olefin Concentrate, Percent: | | | |
| Aromatics | 3.8 | Trace | Trace |
| Conjugated Diolefins | 5.0 | 0.04 | 0.04 |
| Type I Olefins | 92 | 97 | 97 |
| Adsorbent Capacity, w./w. | | >0.60 | >0.54 |

Example XI

Figure 4:
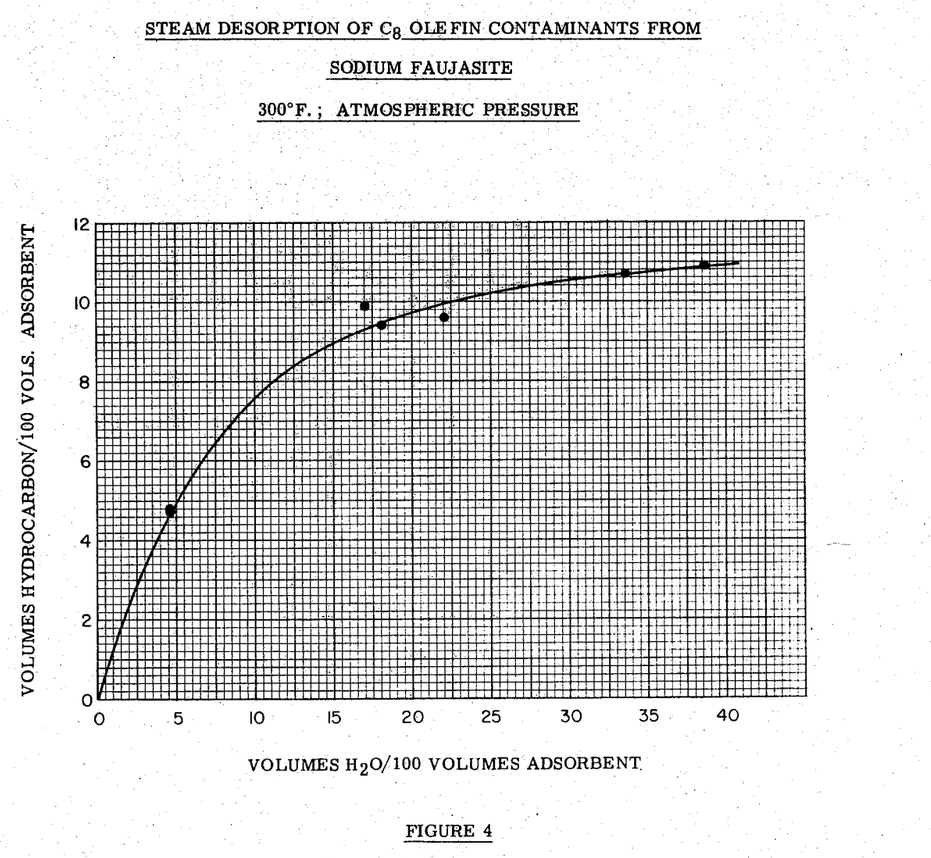

As already indicated, the various faujasite adsorbents applicable to the described process may be freed of adsorbed impurities in a number of ways so as to restore adsorbent capacity. To illustrate, steam was employed in one series of reactivations to remove essentially all adsorbed hydrocarbons from the faujasite followed by air drying at different temperature levels to remove various proportions of the adsorbed water. Sodium and potassium forms of synthetic faujasite were reactivated in this manner and their effectiveness for $C_8$ olefin purification determined with the results shown in Table II. FIGURE 4 shows a typical correlation of the water requirements in desorbing $C_8$ olefin contaminants from a sodium faujasite at 300° F. and atmospheric pressure.

TABLE II.—STEAM-AIR REACTIVATION OF SYNTHETIC FAUJASITES

| | Feed | Cationic Form of Adsorbent | | | | | | | | |
| --- | --- | --- | --- | --- | --- | --- | --- | --- | --- | --- |
| | | Sodium | | | | Potassium | | | | |
| | | Test Number | | | | | | | | |
| | | 34 | 35 | 36 | 37 | 38 | 39 | 40 | 41 | 42 |
| Adsorbent Reactivation: | | | | | | | | | | |
| Steam Temp., °F | | (1) | 300 | 300 | 300 | (1) | 400 | 300 | 400 | 300 |
| Drying Temp., °F | | 1,000 | 1,000 | 800 | 600 | 1,000 | 1,000 | 900 | 400 | 300 |
| Adsorbent Evaluation: | | | | | | | | | | |
| Temperature, °F | | 300 | 300 | 300 | 300 | 400 | 400 | 300 | 400 | 300 |
| Capacity, w./w. Octene [2] | | 0.47 | 0.47 | 0.34 | 0.48 | 0.13 | 0.13 | 0.15 | 0.17 | >0.25 |
| Effluent, Type I Olefin, Percent | 93 | 80 | 80 | 86 | 66 | 90 | 91 | 91 | 62 | 85 |

[1] None, fresh adsorbent. [2] Conjugated diolefin and aromatic-free.

The data of FIGURE 4 and Table II illustrate the effectiveness of steam desorption in faujasite adsorbent reactivation. If alpha olefin isomerization to internal-type olefins is to be minimized or avoided, the sodium-form faujasite is preferably dehydrated at about 700° F. or above following the steaming cycle so as to decrease catalytic activity. These effects are shown in Tests 35 and 36. The potassium faujasite, being much less active catalytically, will tolerate a higher level of adsorbed water. These effects are shown in Tests 39 and 41, wherein potassium faujasite dried at the low level of 300° F. showed only slight catalytic activity in adsorptions at the same temperature. Moderate amounts of adsorbed water enhance adsorbent capacity under these conditions. Extended cyclic operations employing steam desorptions or pre-steaming of the faujasite adsorbents at about 1000° F. and above also reduce the catalytic effects.

Example XII

Figure 5:
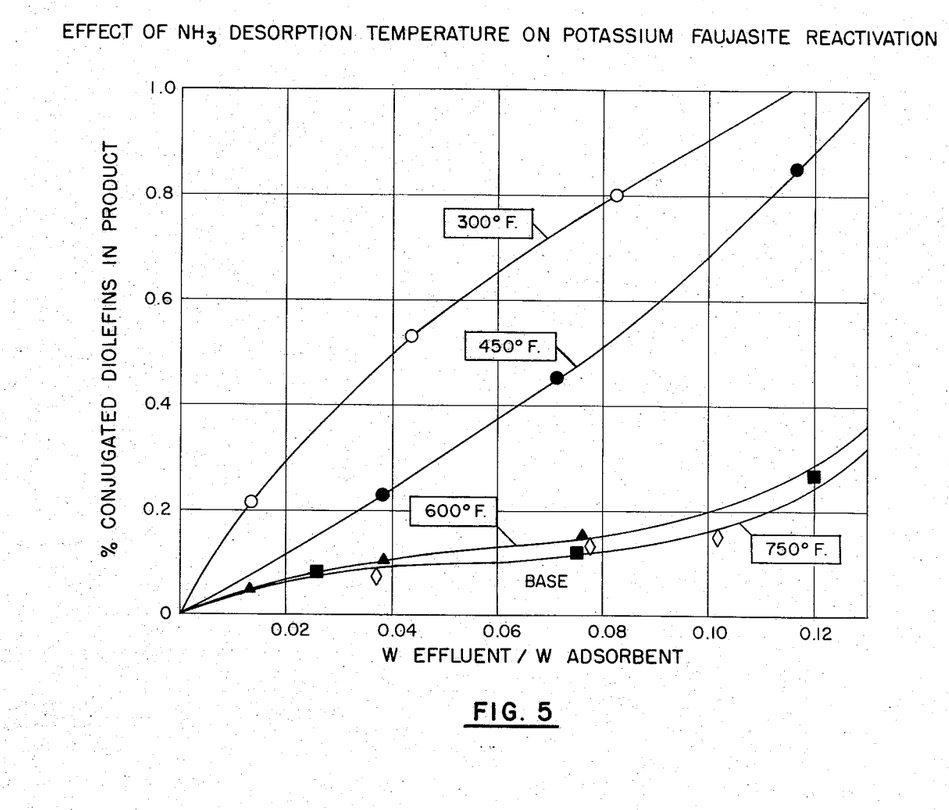

Gaseous ammonia also is an effective desorbent for olefin contaminants. Extensive data have shown that ammonia at 600–750° F. desorbs the contaminants of potassium faujasite and restores adsorptive capacity. FIGURE 5 illustrates the effects of ammonia desorption temperature on reactivated adsorption capacity when purifying a $C_8$ petrolatum olefin at 300° F. and atmospheric pressure.

The first adsorption cycle on fresh potassium faujasite is represented by the bottom correlation line. A 300° F. ammonia desorption followed by a second adsorption cycle gives poor regeneration of capacity as shown. A 450° F. ammonia desorption shows some improvement, while 600° F. ammonia desorption gives an adsorption curve which is essentially the same as the one for fresh adsorbent. The 750° F. ammonia desorption gives similar results.

It may be preferable to displace ammonia from the adsorbent bed preceding the hydrocarbon adsorption cycle with nitrogen or other relatively inert or moderately adsorbable gas.

*Example XIII*

An octene fraction prepared by steam cracking of petrolatum was purified by passage in the vapor phase over synthetic faujasite at 80° F. and 10 mm. pressure. At the completion of the olefin adsorption cycle, the octene feed was discontinued and absolute ethyl alcohol vapor at the same temperature and pressure was admitted to the adsorbent bed to displace the olefin impurities remaining thereon and condition the adsorbent for the subsequent olefin adsorption cycle. The total alcohol fed amounted to 0.30 w./w. which displaced 0.16 w./w. of hydrocarbon from the adsorbent. A major portion (81.2%) of this hydrocarbon was recovered before any alcohol appeared in the desorbate.

In this type operation, the alcohol used may be chosen so that the adsorptive affinity of the zeolite for the olefin and for the alcohol will remain in adequate balance for alternate adsorption and desorption at approximately the same temperature.

What is claimed is:

1. An improved process for the separation of a linear aliphatic mono-olefin from a mixture thereof with corresponding branched and cyclic mono-olefins, diolefins and aromatics which comprises contacting said mixture with a crystalline metallic alumino-silicate adsorbent having a uniform pore opening of about 6 to 15 Angstrom units and a silica to alumina mole ratio above 3 at a temperature of from about 70 to 650° F. and at a pressure of between about 0.01 and 15 atmospheres in an adsorption zone, said mixture being fed to said zone at a rate of from 0.01 to 10 w./w./hr., adsorbing said branched and cyclic mono-olefins, diolefins and aromatics contained in said mixture on said adsorbent and recovering a stream rich in said linear aliphatic mono-olefin.

2. The process of claim 1 in which the linear aliphatic olefin contained in said mixture is a $C_6$–$C_{30}$ olefin.

3. The process of claim 1 in which the adsorbent has a uniform pore diameter of 8 to 15 Angstrom units.

4. The process of claim 1 in which said adsorbent has a silica to alumina ratio of from above 3:1 to 7:1.

5. An improved process for separating linear aliphatic mono-olefins from a mixture thereof with corresponding branched and cyclic mono-olefins, diolefins, and aromatics which comprises passing a vaporized stream comprising said mixture into an adsorption zone at a rate of 0.01 to 10 w./w./hr., maintaining in said zone a zeolite having an empirical formula:

$$0.9 \pm 0.2\ Na_2O : Al_2O_3 : XSiO_2$$

wherein X has a value of from above 3 to 7, said zeolite having a uniform pore size of 6 to 15 Angstrom units, said zone being at a temperature of from 100 to 250° F., adsorbing said branched and cyclic mono-olefins, diolefins, and aromatics on said zeolite in said zone, while withdrawing a stream rich in said linear aliphatic mono-olefin from said zone.

6. The process of claim 5 in which the linear aliphatic mono-olefin contained in the feed mixture is a wax cracked $C_6$–$C_{30}$ olefin.

7. The process of claim 5 in which the linear aliphatic mono-olefin contained in the feed mixture comprises an olefin cut within the range of from 6 to 30 carbon atoms.

8. The process of claim 5 in which the zeolite contained in said adsorption zone is desorbed with ammonia at a temperature of about 100 to 650° F.

9. The process of claim 5 in which the zeolite contained in said adsorption zone is desorbed with steam at a temperature of about 100 to 650° F.

10. An improved process for separating linear aliphatic mono-olefins from a mixture thereof with corresponding branched and cyclic mono-olefins, diolefins, and aromatics which comprises passing a vaporized stream comprising said mixture into an adsorption zone at a rate of 0.01 to 10 w./w./hr., maintaining in said zone a zeolite having an empirical formula:

$$0.9 \pm 0.2\ K_2O : Al_2O_3 : XSiO_2$$

wherein X has a value of from above 3 to 7, said zeolite having a uniform pore size of 6 to 15 Angstrom units, said zone being at a temperature of from 100 to 550° F., adsorbing said branched and cyclic mono-olefins, diolefins, and aromatics on said zeolite in said zone, while withdrawing a stream rich in said linear aliphatic mono-olefin from said zone.

11. The process of claim 10 in which the linear aliphatic mono-olefin contained in the feed mixture is a wax cracked $C_6$–$C_{30}$ olefin.

12. The process of claim 10 in which the linear aliphatic mono-olefin contained in the feed mixture comprises an olefin cut within the range of from 6 to 30 carbon atoms.

13. The process of claim 10 in which the zeolite contained in said adsorption zone is desorbed with ammonia at a temperature of about 100 to 650° F.

14. The process of claim 10 in which the zeolite contained in said adsorption zone is desorbed with steam at a temperature of about 100 to 650° F.

References Cited

UNITED STATES PATENTS

| | | | |
|---|---|---|---|
| 2,988,503 | 6/1961 | Milton et al. | 260—677 |
| 3,063,934 | 11/1962 | Epperly et al. | 260—677 |
| 3,094,569 | 6/1963 | Thomas | 260—677 |

OTHER REFERENCES

"The Chemical Constituents of Petroleum" by A. N. Sachanen, 1945, p. 259, published by Reinhold Pub. Corp., N.Y.

HERBERT LEVINE, *Primary Examiner.*

ALPHONSO D. SULLIVAN, DELBERT E. GANTZ,
*Examiners.*